United States Patent [19]
Roth

[11] 3,871,760
[45] Mar. 18, 1975

[54] GUIDING THE FILM IN MOVIE PROJECTORS

[75] Inventor: Johann Roth, Schwabhausen, Germany

[73] Assignee: Braun Aktiengesellschaft, Frankfurt/Main, Germany

[22] Filed: Apr. 9, 1973

[21] Appl. No.: 349,474

[30] Foreign Application Priority Data
Apr. 18, 1972 Germany............................ 2218793

[52] U.S. Cl.................................... 353/95, 352/227
[51] Int. Cl. ............................................. G03b 1/48
[58] Field of Search ............ 353/95, 96, 23, 69, 97; 352/227, 221, 226; 352/229, 157, 158

[56] References Cited
UNITED STATES PATENTS
2,587,123  2/1952  Dunning .............................. 353/95
2,712,770  7/1955  Bolsey et al. ....................... 352/226

Primary Examiner—Harry N. Haroian
Assistant Examiner—Willis Little
Attorney, Agent, or Firm—Ernest F. Marmorek

[57] ABSTRACT

A film projecting apparatus comprising and guiding arrangement including a film table and a pressure plate cooperating with the film table, springs for biasing the film pressure plate against the film table, either one of the pressure plate or the film table including spacing projections provided on both sides and adjacent the path of the film, the other one of the film table or the pressure plate including depressions cooperating with the spacing projections for providing a gap between the film table and film pressure plate when no film is present therebetween and which gap is narrower than the thickness of the film.

9 Claims, 4 Drawing Figures

GUIDING THE FILM IN MOVIE PROJECTORS

CROSS-REFERENCE TO OTHER APPLICATIONS

Reference is had to applicant's co-pending applications: Ser. No. 297,016, filed Oct. 12, 1972; Ser. No. 345,241, filed Mar. 26, 1973; Ser. No. 345,478, filed Mar. 27, 1973; and Ser. No. 349,475, filed Apr. 9, 1973.

FIELD OF THE INVENTION

The present invention relates to the guiding of the film in film apparatus, especially in film or movie projectors, in which there is provided a fixed film table and a film pressure plate cooperating with the film table and in which the pressure plate is pressed against the film table with a certain bias.

SUMMARY OF THE INVENTION

It is an object of the present invention to provide an improved apparatus for guiding the film within a projection apparatus which permits an easy insertion or threading-in of the film into the apparatus and which provides for an automatic insertion or theading of the film.

According to the present invention in the members which are provided and take part in the guiding of the film, there are provided at least a pair of spacing means which lie at both sides of the path of the film and which when the film pressure plate lies parallel with the film table and if the film is not present therebetween, such spacing means retain a smaller gap between the table and the pressure plate than the thickness of the film. Such spacing means have the effect that the film pressure plate when the film is inserted into the apparatus will require a lifting of the pressure plate by a much smaller amount of the film than in the film guiding devices heretofore known, so that the initial portion of the film can pass into the film guiding arrangement much easier.

According to a special embodiment of the present invention the spacing means comprise a pair of projections arranged transversely with respect to the advancing direction of the film and are provided on the film table or on the film pressure plate.

According to a preferred embodiment of the present invention the spacing means are arranged at the level of the resultant force of the biasing force affecting the film pressure plate. As a result, the film pressure plate can undergo a tilting motion without the creation of substantial counterforces. The threading of the film thereby becomes even easier.

According to another embodiment of the present invention the film pressure plate is biased by means of a pair of similar springs arranged with a distance with respect to each other and along the film advancing direction and that the spacing means are arranged at the level of the median between the spring means. As a result, the insertion or theading-in of the film becomes very easy and a uniform pressure on the film is attained.

The spacing means can project into a recess of the opposite member of the film guiding arrangement, whereby there is attained a fixed positioning of the film pressure plate with respect to the film table.

It is desirable that the entry side of the film guiding arrangement according to the present invention is provided with an aperture for a flim catching device of the advancing apparatus. As a result, the first portion of the film will be caught by the catching means at an instant and a position of the film before the film guiding arrangement could exert any counter effect against the film.

The spacing means lie preferably at the level of the picture window of the film guiding arrangement.

In order to further improve the insertion of the film into the film guiding arrangement, the edges of the picture window which face the entry side of the film should be rounded off or made slanted.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
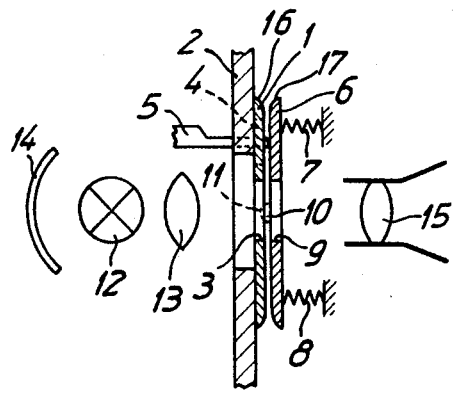
FIG. 1 is a partial sectional view of the film guiding arrangement according to the present invention illustrating only the necessary elements for the understanding of the present invention.

With reference to FIG. 1, the illustrated film guiding arrangement according to the present invention includes a film table 1 which is secured to a housing portion 2 of a film projector. The film table 1 includes a picture window 3 as well as an aperture 4 through which a catching means 5 protrudes in order to provide for the advancing of the film. Adjacent to the film table 1 there is provided a film pressure plate 6 which by means of springs 7 and 8 is pressed against the film table 1. The film pressure plate 6 at the level of the picture window 3 has formed therein a picture window 9.

The film pressure plate 6 at both sides of the film path is provided with a projection 10 each of which protrudes into a small depression 11 provided lying opposite in the film table 1. The depressions 11 and the projections 10 are designed to have a size which permits that the film pressure plate 6 when arranged in a parallel position with respect to the film table 1 will have a distance therefrom, when the film is not present therebetween, which distance will be smaller than the thickness of the film.

On one side of the film guiding arrangement there is provided an illumination device which consists of an incandescent lamp 12, a condenser lens 13 and a condenser mirror 14. On the other side of the film guiding arrangement there is provided an objective 15. These are conventional elements of a film projector.

The edges 16 and 17 of the film table 1 and of the film pressure plate 6 which are considered as the front edges with respect to the direction of the advancing of the film are rounded-off in order to enable an easier threading-in of the front edge of the film into the guiding arrangement.

Figure 2:
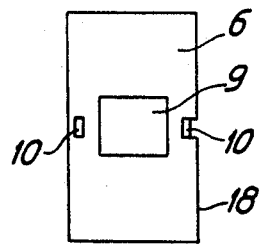
FIG. 2 is a plan view of a pressure plate, according to this invention.
Figure 4:
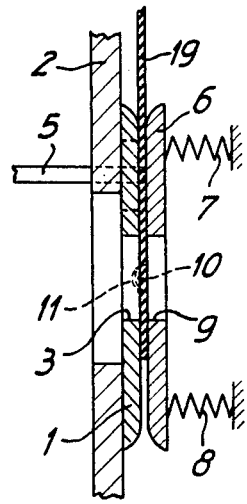
FIG. 4 is a view similar to FIG. 1 illustrating the position when the catching means has engaged the beginning of the film.

With reference to FIG. 2 which is plan view of the film pressure plate 6, one can see that both projections 10 are provided on both sides of the picture window 9, that is, on both sides of the path of advancement of the film 19. The projections 10 can be made by being coined out from the material of the film pressure plate 6 itself or formed by a folding over of a lug portion of the edge 18, as it can be seen on the right side of FIG. 2.

Figure 3:
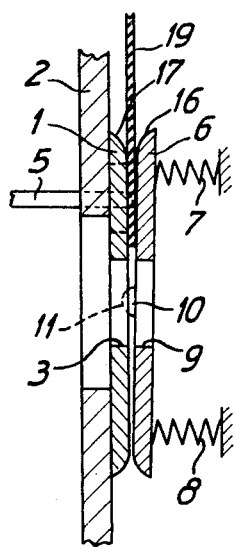
FIG. 3 is a similar figure as the illustration of FIG. 1 particularly illustrating the commencement of the film insertion into the guiding arrangement.

FIG. 3 illustrates the insertion of the film into the arrangement of FIG. 1. One can observe on FIG. 3 that the film pressure plate 6 during such process is tilted or pivoted by a small angular amount in the clockwise direction about the projections 10. Such pivoting movement requires practically no force since the projections 10 are arranged at the level of the resultant of the pressure forces applied to the plate 6 by the springs 7 and 8. The insertion or threading in of the film into the film guiding arrangement will meet practically with no resistance. The film insertion will be made easier when the edges 16 and 17 are rounded off.

After a certain piece of the film has been inserted into the film guiding arrangement, it will be engaged by the catching means 5 and becomes advanced thereby. Inasmuch as the catching means 5 lies in the film advancing direction before the projections 10, the first portion of the film is caught in each case before it would undergo or meet any slight resistance during the insertion process. According to the construction of the film guiding device the insertion of the beginning portion of the film would meet some resistance only when the front edge of the film reaches the level of the projections 10 since then the lifting-off of the film pressure plate 6 starts and, at this point, there is available the full effect of the spring 7 and 8 on the film 19. In this region, however, the film 19 is already engaged by the catching means 5, and is advanced thereby. Inasmuch as the entire region of the film front portion which is engaged by the catching means 5 is surrounded by the film guiding arrangement, the force required to overcome the effect of the film pressure plate 6 will not at all prevent the advancement of the film.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A film guiding arrangement for guiding a film of a certain thickness within a film projection apparatus comprising a film table and a pressure plate in substantially parallel relationship with said film table, biasing means for biasing said film pressure plate against said film table, spacing means provided on both sides of said film adjacent the respective outer edges of said film, said spacing means being mounted in operative relationship with either said film table or said pressure plate for maintaining a gap between said film table and said film pressure plate during the absence of said film and which gap is narrower than the thickness of the film, said film pressure plate being tiltable with respect to said film table, whereby film being inserted into said arrangement at a film entrance side causes said gap thereat to increase while at a film exit side, said gap decreases.

2. The arrangement as claimed in claim 1, wherein said spacing means comprises a pair of projections provided on both sides of the path of the film in said pressure plate transversely with respect to the direction of advancement of the film.

3. The arrangement as claimed in claim 1, wherein said biasing means includes spring means exerting pressure against said pressure plate in the direction towards said film table.

4. The arrangement as claimed in claim 3, wherein said spring means comprises a pair of springs arranged at a distance with respect to each other in the direction of the advancement of the film, said spacing means being arranged substantially along the median between said springs.

5. The arrangement as claimed in claim 1, wherein depressions are defined opposite said spacing means, receiving said spacing means therein.

6. The arrangement as claimed in claim 1 including a film entry opening further comprising a film catching means disposed adjacent said entry opening and a hole defined in said film table, said catching means protruding through said hole to engage said film and advance it.

7. The arrangement as claimed in claim 1, wherein said film table and said pressure plate each have an aperture, said apertures being aligned for passing light therethrough when said film is in position between said film table and said pressure plate, said spacing means being arranged adjacent said apertures.

8. The arrangement as claimed in claim 1, including a film entry opening wherein said film table and said pressure plate are rounded-off at the part at said film entry opening.

9. The arrangement as claimed in claim 7, wherein said apertures have edges and the edges of said apertures near said film entry opening are rounded off.

* * * * *